H. N. FULLENWEIDER.
SHOCK ABSORBING MECHANISM.
APPLICATION FILED MAY 3, 1918.
1,332,391.
Patented Mar. 2, 1920.
2 SHEETS—SHEET 2.
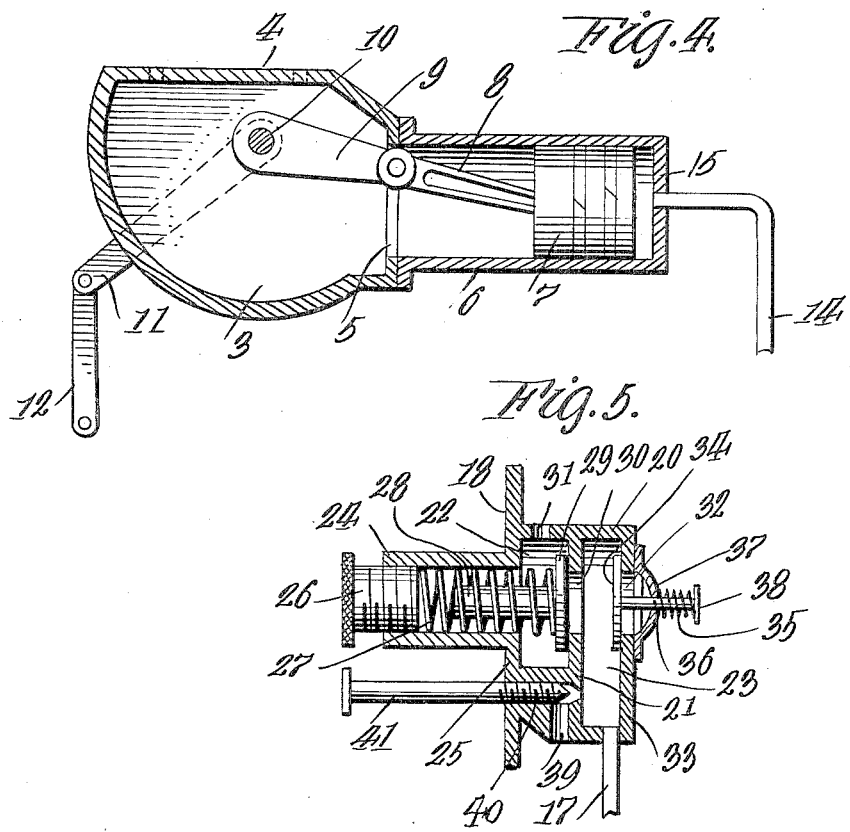
INVENTOR
Henry N. Fullenweider
WITNESSES
Guy M. Spring
H. H. Babcock
BY Richard B. Owen.
ATTORNEY

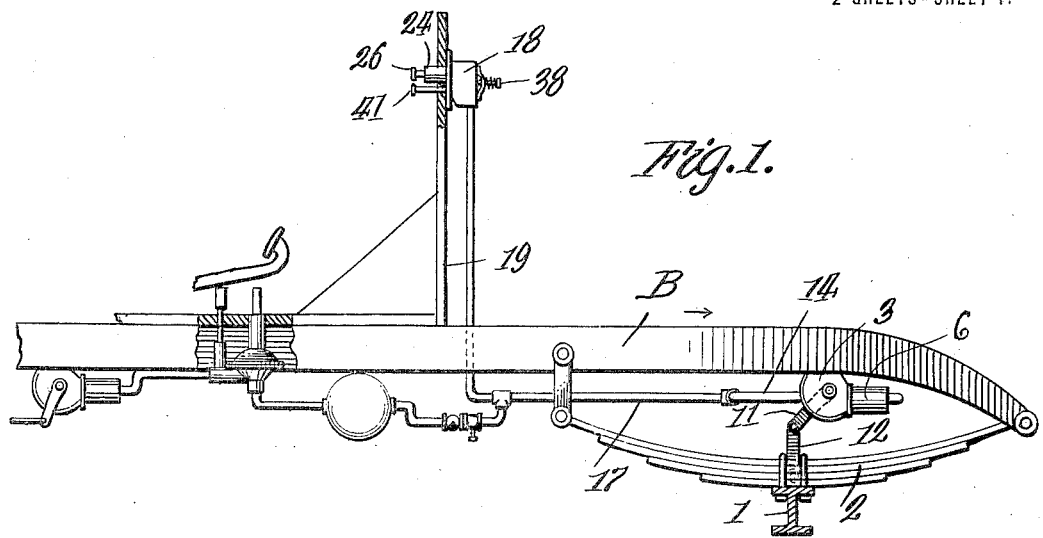
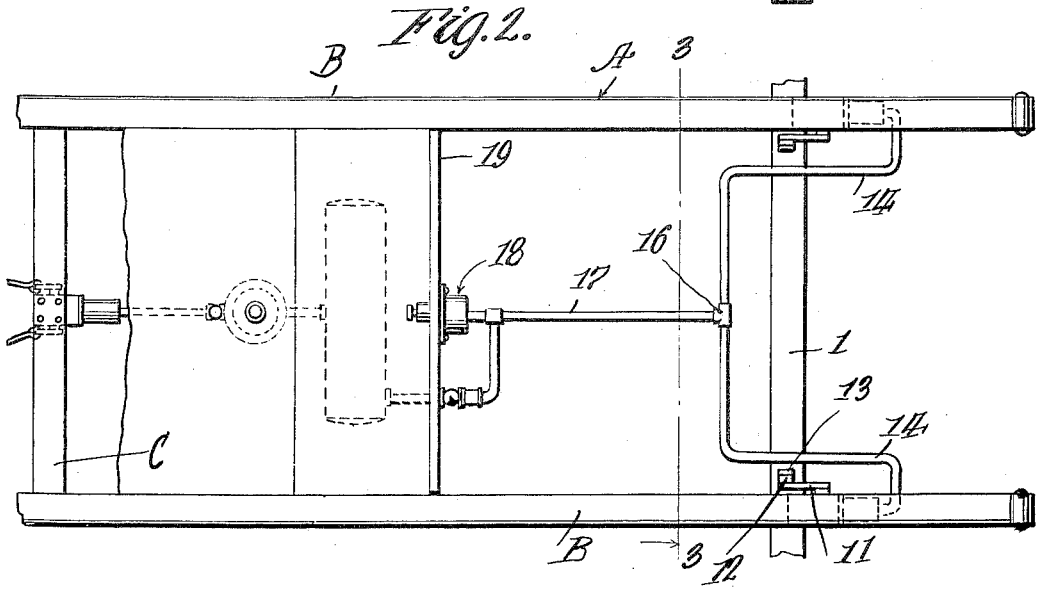

UNITED STATES PATENT OFFICE.

HENRY N. FULLENWEIDER, OF WAVELAND, INDIANA.

SHOCK-ABSORBING MECHANISM.

1,332,391.　　　Specification of Letters Patent.　　Patented Mar. 2, 1920.

Application filed May 3, 1918. Serial No. 232,341.

*To all whom it may concern:*

Be it known that I, HENRY N. FULLENWEIDER, a citizen of the United States, residing at Waveland, in the county of Montgomery and State of Indiana, have invented certain new and useful Improvements in Shock-Absorbing Mechanism, of which the following is a specification.

This invention relates to shock absorbing mechanism especially adapted for use in connection with automobiles and similar vehicles.

The principal object of the invention is to provide shock absorbing means serving to prevent sudden rebound of the springs supporting the vehicle when the springs have been compressed. Another object is to provide shock absorbing means which may be readily adjusted to suit the particular vehicle in connection with which the mechanism is used, the adjustment being readily effected when the vehicle is in motion and without the necessity of removing the parts thereof. A still further object is to provide pneumatic shock absorbers which are so related to the braking mechanism as to supply air under pressure to a compressed air tank for operating the brake control means simultaneously with the operation of the shock absorbers. Further objects will appear from the detailed description.

In the drawings:

Figure 1 is a fragmentary side view of an automobile frame with shock absorbers and brake control means constructed in accordance with my invention applied, Fig. 2 is a top plan view of the same, Fig. 3 is a section taken substantially on line 3—3 of Fig. 2, Fig. 4 is a section through one of the shock absorbers, Fig. 5 is a section through the control valve for the shock absorber.

The automobile frame A may be of any suitable or standard construction being provided with the sills B and cross brace C secured thereto. The front axle 1 of I-beam construction is provided adjacent the front of frame A and is connected thereto by the springs 2 of laminated construction which are connected to the axle and the sills B in any suitable or well known manner. A substantially segmental crank case 3 is secured to the under face of each sill B slightly in advance of the front axle 1. The upper wall 4 of this case is flat or plane and is provided with a plurality of spaced openings which receive securing bolts for securing the case to the sill.

Crank case 3 is provided, through its forward end, with a circular opening 5 which registers with the bore of a cylinder 6 secured to the front ends of the crank case. A piston 7 is operative in this cylinder and is connected by a connecting rod 8 to the outer end of an arm 9 secured on a shaft 10 which is rockably mounted in casing 3. The arm 9 and shaft 10 constitute, in effect, a crank shaft for operating connecting rod 8. A downwardly and rearwardly inclined operating arm 11 is secured to shaft 10 at its upper end, the lower end of this arm being pivotally secured to the upper end of a link 12 the lower end of which is pivoted to the vertical arm of an angle bracket 13 secured to front axle 1 on the upper face thereof. When the front wheel of the vehicle encounters an obstacle, the frame A will be moved toward springs 2 so as to compress these springs, in the usual manner. This movement of the frame will bring the frame closer to axle 1, which results in swinging the operating arm 11 upwardly and rearwardly so as to rock shaft 10, and consequently arm 9 secured thereon, downwardly and rearwardly thus moving the piston 7 rearwardly in cylinder 6. When the springs 2 expand, the frame A will be raised so as to move the piston 7 in the opposite direction toward the forward end of cylinder 6.

An air pipe 14 communicates with cylinder 6 through the forward end 15 thereof. This pipe is connected by a T 16 to an inlet and exhaust pipe 17. This pipe 17 communicates with a control valve designated generally by 18. This valve is, preferably mounted on the instrument board 19 of the vehicle so as to be readily accessible. Valve 18 is provided with a cylindrical body 20 which is divided by a web 21 into compartments 22 and 23, respectively. A tubular member 24 projects from the top 25 of the valve body 20 and communicates with compartment 22. This member receives an adjusting screw 26 threaded therein. Screw 26 serves to adjust the compression of a coil expansion spring 27 which is mounted about the stem 28 of a disk valve 29 adapted to rest upon the upper face of web member 21 so as to normally close an opening 30 provided through this member. This valve constitutes a relief for the shock absorber so as to permit escape of air from valve body 20 into compartment 22 and through the escape port 31 into the atmosphere.

When the vehicle frame is moved toward axle 1, piston 7 is moved inwardly toward the inner end of cylinder 6. This results in drawing air into the cylinder in front of the piston through pipes 14 and 17. This air is first drawn into the lower compartment 23 of the valve body 20 through opening 32 provided through the base 33 of the valve body. This opening is normally closed by a disk valve 34 which is held pressed against the inner face of the bottom of the valve body by a coil expansion spring 35 mounted about the stem 36 of the valve and confined between the spider 37 through which the valve stem is operative and a head 38 secured on the outer end of the stem. Also, a certain amount of air may be drawn into compartment 23 through the exhaust duct 39 which communicates with a bore 40 provided in the body 20 of the valve, this bore receiving an exhaust control valve 41 threaded therein. The inner end of this valve is pointed and coöperates with a similarly formed valve seat provided at the inner end of bore 40 in the well known manner of a needle valve. In practice, the valve 41 and the tubular member 24 will both project through the instrument board 19 so as to be readily accessible and easily adjusted by the driver of the vehicle. As the piston 7 is moved rearwardly in cylinder 6, air will be drawn into the cylinder in front of the piston in the manner described. When the springs 2 expand, and the frame A is raised away from the axle 1, the air which has been drawn into the cylinder in front of the piston will be compressed, thus preventing sudden rebound of the springs. This air will flow into the lower compartment 23 and a part of it will escape through the bore 40 and the exhaust duct 39. The rate at which this air will escape may be accurately controlled by means of valve 41 so as to permit accurate control of the return of the vehicle frame and body into normal position thus preventing all rebound of the springs and eliminating the accompanying shock and jar. The escape valve 29 serves to permit escape of the compressed air into compartment 22 and through the escape port 31 when this air has reached a predetermined pressure, thus effectually preventing sudden stoppage of the piston, 7, during its forward movement due to excessive compression of the air within the cylinder. By means of the adjusting screw 26, the amount of compression of spring 27 may be readily adjusted so as to permit the valve 29 to be set accurately to operate at any desired predetermined pressure thus rendering it possible to quickly and easily adjust the shock absorber for use in connection with any particular vehicle. This escape valve, by permitting escape of the air when it has reached a predetermined pressure, insures smooth operation of the absorber and effectually eliminates all possibility of sudden stoppage of piston 7 and the sudden jars or shocks which would result therefrom.

In practice, it is intended that there will be a shock absorber positioned adjacent each front and each back spring of the vehicle. The absorbers for the back springs may be connected to the same control valve 18 as if employed for the front absorbers, though I prefer to employ two separate valves, one valve for the front shock absorbers and one valve for the back shock absorbers. The operation of the back absorbers will be the same as that of the front ones, the only differences being that the links for rocking the crank shafts of the back absorbers will be connected to the axle housing, instead of being connected directly to the axle as in the case of the front shock absorber.

The foregoing description and the drawings have reference to what may be considered the preferred, or approved, form of invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent, is:

1. The combination with an axle and a vehicle frame supported thereby for movement toward and away from the axle, of a cylinder carried by said frame, a piston operative in the cylinder, connections between said piston and the axle for causing movement of the piston toward the rearward end of the cylinder when the frame is depressed and toward the forward end of the cylinder when the frame is raised, an inlet and exhaust pipe communicating with the cylinder at the forward end thereof, a valve casing connected to said pipe, a check valve for admittting air into said casing and preventing the escape of air therefrom, said casing being provided with an air escape duct, and a safety valve carried by the casing and adapted to permit free escape of air therefrom when the air in the casing has reached a predetermined pressure.

2. The combination with an axle and a vehicle frame supported thereby for movement toward and away from the axle, of a cylinder carried by said frame, a piston operative in the cylinder, connections between said piston and the axle for causing movement of the piston toward the rearward end of the cylinder when the frame is depressed and toward the forward end of this cylinder when the frame is raised, an inlet and exhaust pipe communicating with the cylinder at the forward end thereof, a valve casing connected to said pipe, a check valve for admitting air into the casing and preventing the escape of air therefrom, said casing being provided with an air escape duct, and a safety valve carried by the casing for permitting free escape of air therefrom when the air within the casing reaches a predetermined pressure, said valve being adjustable so as to vary the predetermined pressure at which free escape of the air is permitted.

3. The combination with an axle and a vehicle body supported thereby for movement toward and away from the axle, of a cylinder carried by said frame, a piston operative in the cylinder, connections between said piston and the axle for moving the piston rearwardly of the cylinder when the frame is raised, a pipe communicating at one end with the forward end of the cylinder, a valve casing connected to the pipe at the other end thereof, said casing being provided with air inlet and exhaust openings, a check valve controlling the inlet opening for admitting air into the casing when the piston is moved rearwardly in said cylinder, an adjustable valve for controlling the air outlet opening, and a safety valve for permitting free escape of air from the casing when the air within the casing reaches a predetermined pressure.

4. A valve for use in connection with pneumatically controlled shock absorbing means comprising a casing having air inlet and exhaust openings, a check valve controlling the air inlet opening, an adjustable valve controlling the exhaust opening so as to permit the rate at which air may be exhausted from said casing to be accurately controlled, said casing being further provided with a safety air exhaust opening, and a safety valve normally closing said safety exhaust opening and adapted to be actuated when the air within the casing reaches a predetermined pressure so as to permit free escape of the air.

In testimony whereof I affix my signature in presence of two witnesses.

HENRY N. FULLENWEIDER.

Witnesses:
JAMES J. CLEMENTS,
HENRY D. VAN CLEAVE.